(12) United States Patent
Lee

(10) Patent No.: US 6,771,621 B1
(45) Date of Patent: Aug. 3, 2004

(54) METHOD FOR ALLOCATING LINK RESOURCES BETWEEN MOBILE SWITCHING CENTER AND BASE STATION

(75) Inventor: Chan-Bok Lee, Seoul (KR)

(73) Assignee: Samsung Electronics Co, LTD, Suwon-Si (KR)

( * ) Notice: Subject to any disclaimer, the term of this patent is extended or adjusted under 35 U.S.C. 154(b) by 0 days.

(21) Appl. No.: 09/526,008

(22) Filed: Mar. 15, 2000

(30) Foreign Application Priority Data

Mar. 15, 1999 (KR) .......................................... 1999-8560

(51) Int. Cl.$^7$ ............................. H04Q 7/00; H04Q 7/20
(52) U.S. Cl. ...................... 370/331; 370/322; 370/328; 455/428; 455/439
(58) Field of Search .............................. 370/310.2, 322, 370/328, 329, 331; 455/436, 437, 439, 442, 431, 422, 414, 417, 427, 428

(56) References Cited

U.S. PATENT DOCUMENTS

| | | | |
|---|---|---|---|
| 5,175,867 A | * | 12/1992 | Wejke et al. |
| 5,794,149 A | * | 8/1998 | Hoo |
| 5,873,036 A | * | 2/1999 | Vucetic |
| 5,937,353 A | * | 8/1999 | Fapojuwo |
| 5,940,762 A | * | 8/1999 | Lee et al. |
| 6,212,389 B1 | * | 4/2001 | Fapojuwo |
| 6,445,911 B1 | * | 9/2002 | Chow et al. |

* cited by examiner

Primary Examiner—Afsar Qureshi
(74) Attorney, Agent, or Firm—Cha & Reiter, LLC

(57) ABSTRACT

A method for allocating a link resource between a mobile switching center and a base station is disclosed. The method comprises (a) sending a handoff request message including information about a link resource requested by the mobile switching center, from the mobile switching center to the base station; (b) sending a handoff response message from the base station to the mobile switching center when the link resource requested by the mobile switching center is available for service; (c) sending a handoff fail message including information about a link resource requested by the base station, from the base station to the mobile switching center, when the link resource requested by the mobile switching center is unavailable for service; (d) sending a resource allocation request message from the mobile switching center to the base station, when the link resource requested by the base station is available; (e) sending a resource allocation request message including information about a new link resource requested by the mobile switching center, from the mobile switching center to the base station, when the link resource requested by the base station is unavailable; (f) sending the handoff response message from the base station to the mobile switching center, when the link resource included in the resource allocation request message from the mobile switching center is available; and (g) repeating steps (c) to (f), when the link resource included in the resource allocation request message from the mobile switching center is unavailable. The link resource information is included in the circuit identification code extension information.

10 Claims, 2 Drawing Sheets

METHOD FOR ALLOCATING LINK RESOURCES BETWEEN MOBILE SWITCHING CENTER AND BASE STATION

CLAIM OF PRIORITY

This application makes reference to, incorporates the same herein, and claims all benefits accruing under 35 U.S.C. Section 119 from an application for "Method for Allocating Link Resources between Mobile Switching Center and Base Station" filed in the Korean Industrial Property Office on Mar. 15, 1999 and there duly assigned Ser. No. 99-8560.

BACKGROUND OF THE INVENTION

1. Field of the Invention

The present invention relates generally to a method for allocating link resources between a mobile switching center and a base station, and in particular, to a method for allocating a link resource designated by a base station upon a handoff failure, to perform an inter-system handoff.

2. Description of the Related Art

FIG. 1 shows a conventional procedure for allocating a link resource between a mobile switching center (MSC) and a base station (BS). As illustrated, a mobile switching center 11 sends a handoff request message to a base station 12 in step S11, and upon receipt of the handoff request message, the base station 12 sends a handoff response message to the mobile switching center 11, in step S12, to inform the acceptance of the handoff request.

The IS-634A base station 12 can designate a specific resource by sending the mobile switching center 11 resource allocation information together with a configuration module service request message and a paging resource message including a circuit identification code. Therefore, except where the mobile switching center 11 cannot allocate a specific resource designated by the base station 12 for call termination and origination, the mobile switching center 11 can normally allocate the resources, thereby increasing the resource allocation efficiency of the base station 12, requires allocation of different resources according to the services.

However, this is applicable only to the call termination or origination but cannot be applied to the inter-system handoff which requires the allocation of new resources. Therefore, the base station 12, which has the authority to freely allocate the resources for the call termination/origination, is deprived of that authority. Thus, the mobile switching center 11 should implement the resource allocation function.

SUMMARY OF THE INVENTION

It is, therefore, an object of the present invention to provide a method for enabling a base station to allocate link resources used between a mobile switching center and the base station not only during the call termination and origination but also during an inter-system handoff.

To achieve the above object, there is provided a method for allocating a link resource between a mobile switching center and a base station. The method comprises the steps of: (a) sending a handoff request message including information about a link resource requested by the mobile switching center, from the mobile switching center to the base station; (b) sending a handoff response message from the base station to the mobile switching center when the link resource requested by the mobile switching center is available for a service; (c) sending a handoff fail message including information about a new link resource requested by the base station, from the base station to the mobile switching center, when the link resource requested by the mobile switching center is unavailable for the service; (d) sending a resource allocation request message from the mobile switching center to the base station when the link resource requested by the base station is available; (e) sending a resource allocation request message including information about a new link resource requested by the mobile switching center from the mobile switching center to the base station, when the link resource requested by the base station is unavailable; (f) sending the handoff response message from the base station to the mobile switching center when the link resource included in the resource allocation request message from the mobile switching center is available; and (g) repeating steps (c) to (f), when the link resource included in the resource allocation request message from the mobile switching center is unavailable. The link resource information is included in the circuit identification code extension information.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. For the purpose of clarity, well-known functions or constructions are not described in detail as they would obscure the invention in unnecessary detail.

The invention provides an algorithm/method for enabling a base station to allocate link resources during an inter-system handoff by using a message as set forth in the IS-634A standard. In the embodiment of the present invention, the base station can allocate the link resources using the IS-634A message, without additional message or information, by simply modifying the algorithm/method.

Figure 1:
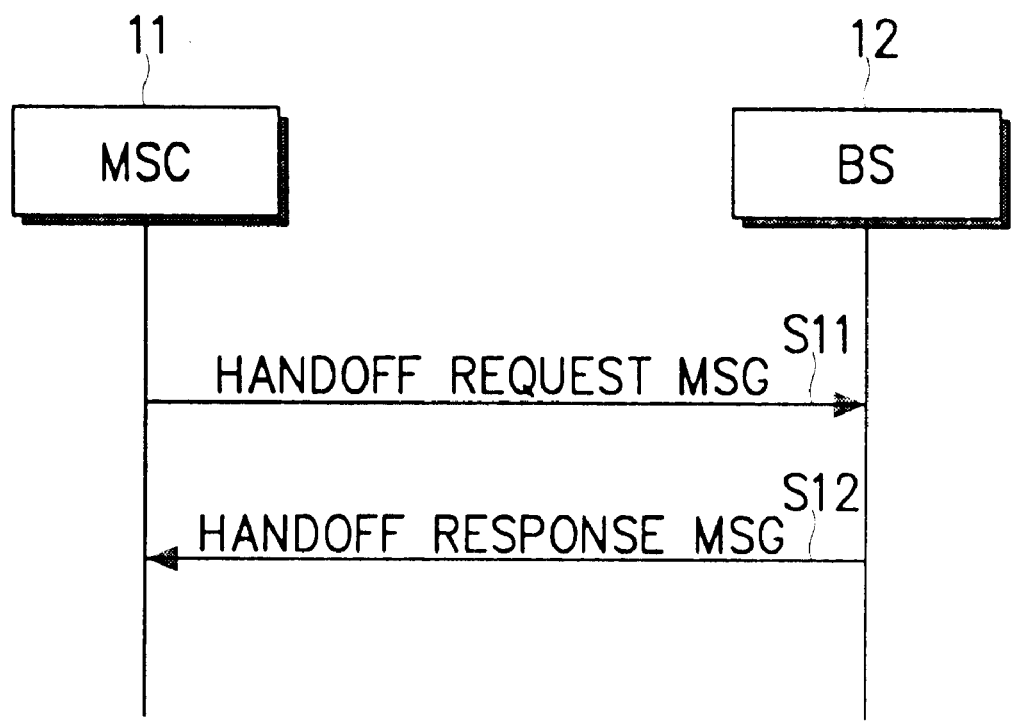
FIG. 1 is a flow diagram illustrating a conventional procedure for allocating link resources between a mobile switching center and a base station.
Figure 2:
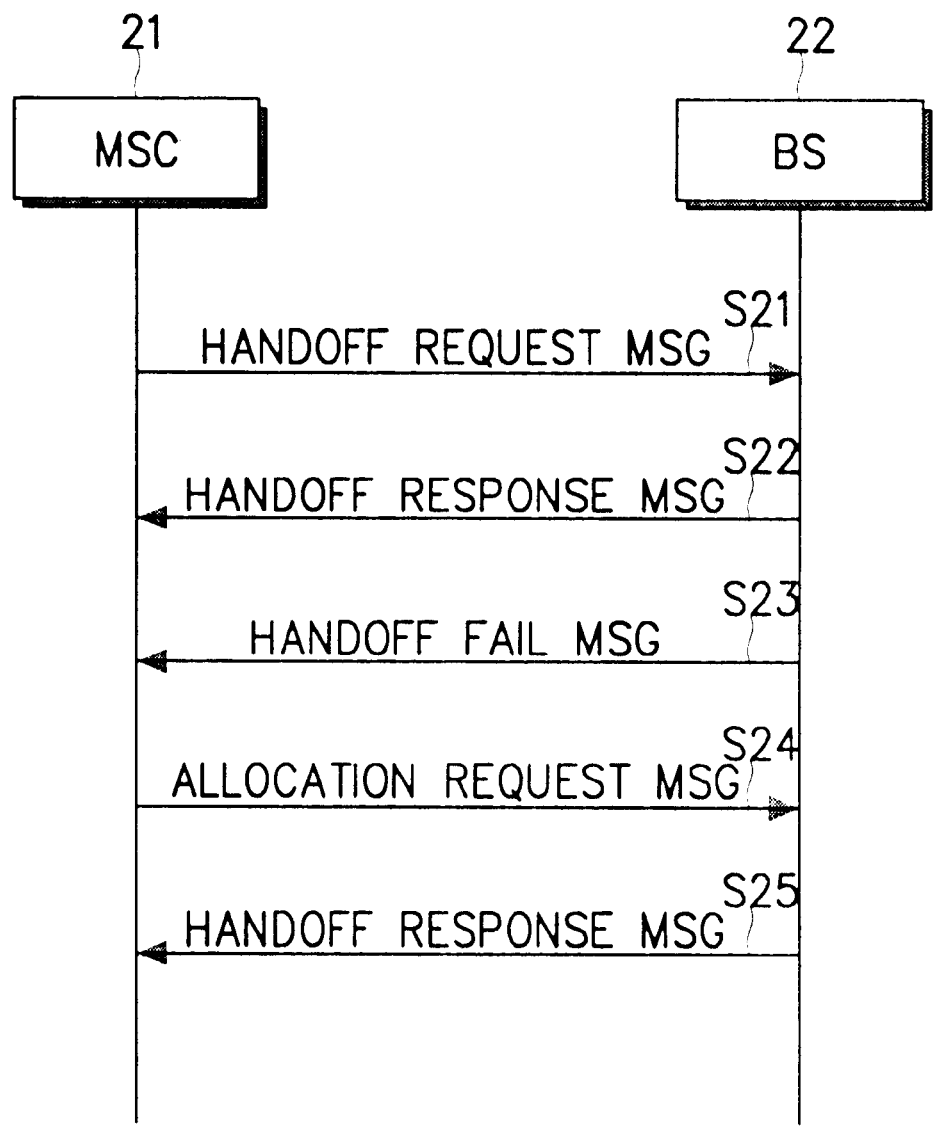
FIG. 2 is a flow diagram illustrating a procedure for allocating link resources between a mobile switching center and a base station according to the embodiment of the present invention.

Referring to FIG. 2, a mobile switching center 21 sends a handoff request message to a base station 22. At this point, the mobile switching center 21 sends the base station 22 a resource intended to be allocated, together with the circuit identification code extension information.

Conventionally, the base station 12 allocates the resources requested by the mobile switching center 11 according to the circuit identification code extension, and when the handoff fails due to a service restriction, the base station 12 sends a handoff fail message to the mobile switching center 11 and then quits the handoff.

Since the base station 12 cannot allocate the intended resource as stated above, the invention provides algorithm/method for allocating the resource proposed by the base station 22 upon a handoff fail due to the service restriction. With reference to FIG. 2, in step S21, the mobile switching center 21 sends a handoff request message, which includes the circuit identification code extension information and the link resource information, to the base station 22. Upon receipt of the handoff request message, the base station 22 sends, in step S22, a handoff response message to the mobile switching center 21 to notify the acceptance of the handoff request if it is determined that the requested link resource is available for the service. Otherwise, if it is determined that the link resource requested by the mobile switching center 21 is unavailable for the service, the base station 22 sends a handoff fail message to the mobile switching center 21 in step S23. Here, the handoff fail message includes information about a resource that the base station 22 designates for a new resource allocation and the resource allocation information is included in the circuit identification code extension. For example, the handoff fail message is a requested terrestrial resource unavailable message. Upon receipt of the handoff fail message due to the unavailability of requested link resource, the mobile switching center 21 examines the resource allocation information included in the circuit identification code extension received from the BS together with the handoff fail message, and sends, if the resource designated by the base station is available, a resource allocation request message to the base station 22 in step S24.

However, when the resource designated by the base station 22 is unavailable, the mobile switching center 21 sends information about a new available resource to the base station 22, together with the resource allocation request message. Upon receipt of the resource allocation request message, the base station 22 examines, in step S25, whether the resource requested by the mobile switching center 21 is available, and sends, if the requested resource is available, a handoff response message to the mobile switching center 21 to inform the acceptance of the handoff request, in step S25. Otherwise, when the requested resource is unavailable, steps S23 to S25 are repeated.

As described above, the novel method can allocate a resource designated by the base station upon a handoff failure during an inter-system handoff, thereby making it possible to perform the handoff.

While the invention has been shown and described with reference to a certain preferred embodiment thereof, it will be understood by those skilled in the art that various changes in form and detail may be made therein without departing from the spirit and the scope of the invention as defined by the appended claims.

What is claimed is:

1. A method for allocating a link resource between a mobile switching center and a base station, comprising the steps of:
   (a) sending a handoff request message from the mobile switching center to the base station, the handoff request message including information about a link resource requested by the mobile switching center, the link resource information being included in a first circuit identification code extension information of the handoff request message;
   (b) sending a handoff response message from the base station to the mobile switching center when a handoff is available;
   (c) sending a handoff fail message from the base station to the mobile switching center when the handoff is unavailable;
   (d) sending a resource allocation request message from the mobile switching center to the base station in response to the handoff fail message; and,
   (e) sending the handoff response message from the base station to the mobile switching center if the handoff is available.

2. The method as claimed in claim 1, wherein the handoff response message is transmitted from the base station to the mobile switching center to notify the acceptance of the handoff request if the link resource requested by the mobile switching center is available for service.

3. The method as claimed in claim 1, wherein the handoff fail message is transmitted from the base station to the mobile switching center if the link resource requested by the mobile switching center is unavailable for service.

4. The method as claimed in claim 3, wherein the handoff fail message transmitted from the base station includes a new link resource allocation information to be allocated, wherein the new link resource allocation information is included in a second circuit identification extension information of the handoff fail message.

5. The method as claimed in claim 4, wherein the handoff fail message includes a requested terrestrial unavailable message.

6. The method as claimed in claim 1, wherein the resource allocation request message is transmitted to the base station if the mobile switching center determines that the resource designated by the base station is available.

7. The method as claimed in claim 1, wherein the resource allocation request message includes information about a new link resource if the mobile switching center determines that the link resource designated by the base station is unavailable.

8. The method as claimed in claim 1, wherein the handoff response message is transmitted from the base station to the mobile switching center to inform the acceptance of the handoff request if the base station determines that the link resource requested by the mobile switching center is available.

9. The method as claimed in claim 1, further comprising the step of repeating steps (c) to (e) if the link resource requested by the mobile switching center is unavailable.

10. A method for allocating a link resource between a mobile switching center and a base station, comprising the steps of:
   (a) sending a handoff request message including information about a link resource requested by the mobile switching center from the mobile switching center to the base station, the link resource information being included in a circuit identification code extension information;
   (b) sending a handoff response message from the base station to the mobile switching center if the link resource requested by the mobile switching center is available for a service;
   (c) sending a handoff fail message including information about a link resource requested by the base station from the base station to the mobile switching center if the link resource requested by the mobile switching center is unavailable for the service;
   (d) sending a resource allocation request message from the mobile switching center to the base station if the link resource requested by the base station is available;
   (e) sending a resource allocation request message including information about a new link resource requested by the mobile switching center from the mobile switching center to the base station if the link resource requested by the base station is unavailable;
   (f) sending the handoff response message from the base station to the mobile switching center if the link resource included in the resource allocation request message from the mobile switching center is available; and, (g) repeating steps (c) to (f), when the link resource included in the resource allocation request message from the mobile switching center in step (e) is unavailable.

* * * * *